United States Patent [19]

Rauh et al.

[11] Patent Number: 4,704,026

[45] Date of Patent: Nov. 3, 1987

[54] COPYING METHOD AND ARRANGEMENT FOR DIFFICULT-TO-COPY ORIGINALS

[75] Inventors: Hans-Jürgen Rauh, Munich; Günter Findeis, Sauerlach; Ernst Biedermann, Taufkirchen; Bernhard Knör, Hoehenkirchen, all of Fed. Rep. of Germany

[73] Assignee: Agfa-Gevaert Aktiengesellschaft, Leverkusen, Fed. Rep. of Germany

[21] Appl. No.: 779,700

[22] Filed: Sep. 24, 1985

[30] Foreign Application Priority Data

Oct. 9, 1984 [DE] Fed. Rep. of Germany ....... 3437069

[51] Int. Cl.$^4$ ............................................. G03B 27/80
[52] U.S. Cl. ........................................ 355/38; 355/77
[58] Field of Search .............................. 355/38, 68, 77

[56] References Cited

U.S. PATENT DOCUMENTS

| | | | |
|---|---|---|---|
| 4,264,194 | 4/1981 | Pone et al. ......................... | 355/68 X |
| 4,279,502 | 7/1981 | Thurm et al. ........................ | 355/38 |
| 4,293,215 | 10/1981 | Rosborough, Jr. et al. ..... | 355/77 X |
| 4,464,045 | 8/1984 | Findeis et al. ..................... | 355/38 |
| 4,563,083 | 1/1986 | Shiota .................................. | 355/38 |

Primary Examiner—L. T. Hix
Assistant Examiner—D. Rutledge
Attorney, Agent, or Firm—Peter K. Kontler

[57] ABSTRACT

A strip of originals is copied onto a band of copy material at high speed using a highly automated copier which measures the densities of the originals in the primary colors and calculates exposures from the densities. The calculated exposures for each original in each primary color are recorded. The band of exposed copy material is developed and the copies are evaluated. Unsatisfactory copies are marked. The band of copy material is subsequently cut into individual copies and the unsatisfactory copies, as well as the corresponding originals, are collected. These originals are recopied in a second copier which is far less sophisticated and expensive than the first copier. The exposures used to recopy an original are derived by applying correction factors to the recorded exposures for the original. By performing the recopying procedures, which are rather slow because they require manual operations, in a second copier, the output of the high speed copier can be maintained.

16 Claims, 3 Drawing Figures

COPYING METHOD AND ARRANGEMENT FOR DIFFICULT-TO-COPY ORIGINALS

BACKGROUND OF THE INVENTION

The invention relates generally to a method of and an arrangement for copying colored originals, e.g., film negatives.

More particularly, the invention relates to a method of and an arrangement for copying colored originals which are difficult to copy properly.

Highly sophisticated but complicated procedures for automatic exposure control during color copying have been developed. The development of these procedures has reduced the need for an operator who functions to supply exposure correction factors to the copier in the event that an original is difficult to copy, e.g., due to strong color dominants or color casts. Moreover, the operating speed of copiers using such procedures has become so high that an operator is hardly able to keep pace. Accordingly, the great majority of color copies, particularly in the amateur area, are produced by running the originals through a copier fully automatically. If a copy is unsatisfactory, the corresponding original is returned to the copier by hand or by an automatic conveyor and recopied with further exposure corrections. Recopying is performed in the highly automated copier used initially rather than in a simpler copier since the results which will be obtained with a simpler copier are difficult to predict. Thus, as a rule, an operator is unable to accurately reproduce the exposure conditions used by the automatic exposure control unit during the initial run.

Highly sophisticated copiers are very expensive, and the use of such a copier for the repeat copying of originals means that a very expensive piece of equipment operates with a very poor efficiency, i.e., the speed of the operator, for a certain length of time in order to produce a relatively small number of copies. This problem is not overcome by the use of an automatic band conveyor to return originals to the copier. Thus, an additional operating step is involved in placing the originals to be recopied on the band conveyor. Moreover, in order to make it worthwhile to set up the copier for repeat copying, it is necessary to collect the originals to be recopied. In view of the high rate at which modern copiers process orders, the delays occasioned by these operations are very undesirable.

OBJECTS AND SUMMARY OF THE INVENTION

It is an object of the invention to provide an arrangement which increases the likelihood of recopying an original properly even though the recopying operation is not performed in a highly sophisticated copier.

Another object of the invention is to provide a method which improves the chances of recopying an original properly even though the latter is not recopied in a highly sophisticated copier.

The preceding objects, and others which will become apparent as the description proceeds, are achieved by the invention.

One aspect of the invention resides in a method of copying colored originals. The method involves measuring the densities of the originals in each of the primary colors, and calculating the exposure for each original in each primary color based on the measured densities. A copy of each original is then made using the respective calculated exposures. The calculated exposures for each original are recorded in such a manner as to permit the recorded exposures for an original to be related to the original. The copies obtained from the originals are evaluated, and originals which yielded unsatisfactory copies are recopied without remeasuring the densities of the originals. The recopying step includes correcting the recorded exposures for each original to be recopied, and illuminating each such original using the corrected exposures.

The originals may constitute discrete frames of a coherent strip, e.g., each original may constitute a negative or exposure of a length of film. The copy making step may then be carried out by forming latent images of the originals on neighboring portions of a coherent band of copy material and subsequently developing the band. The strip and the band are subdivided, and the unsatisfactory copies and corresponding originals collected. Preferably, the unsatisfactory copies are marked prior to subdivision of the band of copy material.

Another aspect of the invention resides in an arrangement for copying colored originals. The arrangement comprises a first copier having scanning means for measuring the densities of the originals in the primary colors, and first copying means including first control means connected with the scanning means and designed to calculate the exposures for each original in each primary color based on the measured densities. The first control means is also designed to control the illumination of each original in each primary color. The first copier further comprises recording means connected with the first control means and arranged to record the calculated exposures for each original in such a manner as to permit the recorded exposures for an original to be related thereto. In addition to the first copier, the arrangement includes a second copier having second copying means for recopying an original with corrected exposures when a copy of the original made in the first copier is unsatisfactory. The second copier is provided with correcting means for correcting the recorded exposures for an original.

The second copier may further include second control means for controlling the illumination of an original to be recopied in each primary color. The recopying step may then comprise regulating the second control means with the corrected exposures.

The invention stems from the recognition that a good second copy of an original can be achieved only when the exposures for the first copy are precisely known. The precise exposures used for the first copy can be obtained by making the second copy in the same copier as employed for the first copy or in an identical second copier. However, both of these possibilities involve considerable expense inasmuch as the first copy is produced in a highly sophisticated copier. Furthermore, from a measuring point of view, it is not so simple to employ a second copier identical to the first for the production of the second copy. Thus, the scanning systems for the two copiers must be calibrated identically.

The invention approaches the problem of obtaining a good second copy in an entirely different manner. This approach resides in recording or storing the exposures which the highly sophisticated first or primary copier calculates for each original in the three primary colors.

According to one embodiment of the invention, the calculated exposures for an original are recorded by regulating a suitable imprinting device such as, for example, a printing needle, which imprints the exposures on the back of the corresponding first copy. The exposures may be imprinted in an unencoded form or in the form of a code, e.g., a bar code. The original will generally have a number assigned to it, and the imprinting device may likewise imprint such number on the back of the respective copy in encoded or unencoded form so that the latter may be associated with the original. The imprinting device is regulated by the control means of the primary copier, and a transducer may be interposed between the control means and the imprinting device.

As mentioned earlier, the originals may constitute discrete frames of a coherent strip, and the primary copier then includes first transporting means for advancing the strip along a first path and second transporting means for advancing a band of copy material along a second path. The copying means of the first copier comprises a copying station at which copy material in the second path is exposed to light transmitted through an original in the first path, and the copying station, in turn, includes an exposure window having a downstream edge. The imprinting device is preferably located in the region of this edge.

In accordance with another embodiment of the invention, the calculated exposures for each original are recorded on a magnetic memory, e.g., a magnetic disc of the type known as a floppy disc. The recording means of the primary copier here includes a magnetic recording device which, in the case of a floppy disc, may be in the form of a disc drive. The exposures for each original are stored at a location of the magnetic memory which is related to the position of the original in the strip of originals.

When the exposures are recorded magnetically, the second or auxiliary copier is provided with means, e.g., a disc drive, for retrieving or recalling the exposures stored in the magnetic memory. The retrieving means is connected with an input for supplying the retrieving means with the position of an original to be recopied.

Since, in any event, the control means of the primary copier precisely prescribes the exposures for each original in each primary color, it is not difficult to record these exposures. Once the exposures have been recorded, a second copy may be made in an auxiliary copier which is far simpler and less expensive than the primary copier and neither contains nor employs measuring circuitry as complex as that of the primary copier. The recorded exposures, i.e., the exposures used for the first copy, are fed into the auxiliary copier as basic data for calculating corrected exposures. When the exposures used for making a first copy of an original are recorded on the back of the first copy, the recorded exposures may be supplied to the auxiliary copier manually or by means of an automatic reader or decoder. In the case of magnetic recordation of the exposures calculated by the primary copier, the recorded exposures may be entered in the auxiliary copier via a playback device for the magnetic memory.

In order to obtain a good second copy of an original, it is only necessary to enter correction factors which, based on the first copy, will produce a change such that the second copy is satisfactory. Experience has shown that correction factors established on the basis of an unsatisfactory first copy produce much more reliable results than an entirely new determination of the exposures.

The method according to the invention is of particular advantage in a copying procedure such as disclosed in the West German patent No. 19 14 360. The copying procedure of the West German patent is performed by splicing together a series of films end-to-end to form an elongated strip which is wound onto a supply reel. The strip is advanced through a copier by paying it out from the supply reel and rewinding it onto a take-up reel. As the strip advances through the copier, successive originals or frames are copied on successive portions of a band of copy material which is likewise advanced through the copier from a supply reel to a take-up reel.

In the procedure of the West German patent, the exposures in the three primary colors for the production of a first copy of a given original are calculated on the basis of density measurements obtained from a series of originals and, in particular, those originals which belong to the same film as the given original and are worthy of being copied. After development of the exposed copy material, the films of the strip as well as the band of copy material are cut into sections. Under these circumstances, repetition of the initial density measurements at reasonable expense is no longer possible.

The novel features which are considered as characteristic of the invention are set forth in particular in the appended claims. The improved copying arrangement itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
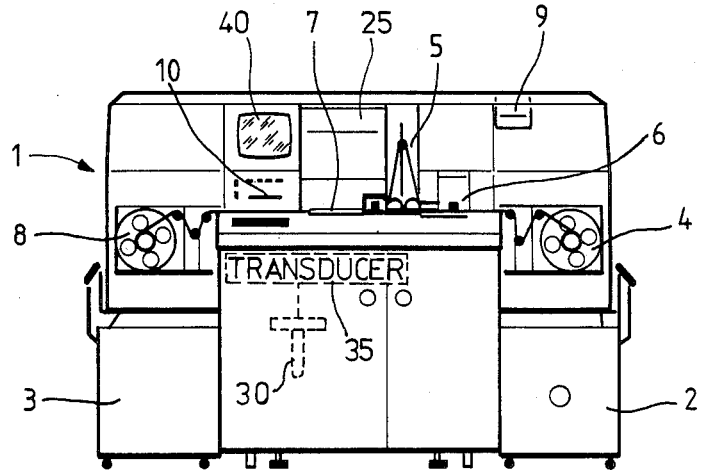
FIG. 1 is a front view of a highly sophisticated copier forming part of a copying arrangement according to the invention.

Referring to FIG. 1, the reference numeral 1 generally identifies a modern, highly automated first or primary copier which is employed for the initial production of copies from originals, i.e., the copier 1 is used to make the first copies of originals. It is assumed here that the copier 1 is designed to copy originals in the form of film negatives. The copier 1 is a roll copier, that is, a copier of the type which can process an elongated strip consisting of a series of films spliced end-to-end. The strip is wound onto a supply reel 4 which is located at the right-hand side of the copier 1, and is advanced through the copier 1 from right to left by means of a take-up reel 8 disposed at the left-hand side of the copier 1 and driven by a non-illustrated motor. The negatives or originals, which constitute discrete frames of the individual films and the film strip, travel through the copier 1 seriatim as the strip is advanced. The supply reel 4 and the take-up reel 8 together constitute a transporting means for advancing the film strip and the originals through the copier 1 along a predetermined path.

The copier 1 further includes a supply unit 2 for copy material in the form of a band. The supply unit 2 comprises a supply reel, and an unexposed band of copy material is wound onto such reel. The supply unit 2 rests on the floor. The copier 1 also includes a take-up unit 3 which likewise rests on the floor and is identical in construction to the supply unit 2. The take-up unit 3 comprises a take-up reel which is driven by a non-illustrated motor and functions to advance the copy material through the copier 1. Copy material which has been paid out from the supply reel and exposed during copying of an original is wound onto the take-up reel. The copier 1 is designed in such a manner that the copy material is shielded from light originating outside of the copier 1 as the copy material travels from the supply unit 2 to the take-up unit 3. The supply unit 2 and the take-up unit 3 together constitute a transporting means for advancing the copy material through the copier 1 along a predetermined path.

An original paid out from the supply reel 4 first passes through a scanning station 6 in which the density of the original in each primary color is measured. The original next travels through an accumulator 5 before entering a copying station having a copying window 7. The accumulator 5 serves to increase the length of the path between the scanning station 6 and the copying station so that the leading original of a film will not enter the copying station before the trailing original of the film has been scanned. To this end, the accumulator 5 causes each original to follow a tortuous route from the scanning station 6 to the copying station. By preventing the leading original of a film from entering the copying station before the trailing original has been scanned, it becomes possible to establish a parameter characteristic of the film before the leading original is copied. This parameter may then be used in calculating the exposure for each original of the film.

The scanning station 6 is connected with an automatic control means or exposure control unit 25 forming part of the copying station. The exposure control unit 25 functions to calculate the exposure for each original in each primary color based on data received from the scanning station 6, i.e., the exposure control unit 25 calculates the amount of light in each primary color to which an original must be exposed in order to generate a satisfactory copy. The exposure control unit 25 further functions to regulate the exposure of an original so that the latter is illuminated with the correct amount of light in each primary color.

Once an original has been copied, the original travels to the take-up reel 8 which rewinds the strip of films into a roll.

The exposure control unit 25 is also connected with a disc drive 9 located in the upper right-hand portion of the copier 1. The disc drive 9 has a slot for insertion of a magnetic disc such as a floppy disc. The disc drive 9 constitutes a recording means and permits the exposures calculated by the exposure control unit 25 to be magnetically recorded. The exposures for each original in each primary color are recorded on the magnetic disc in such a manner that the recorded exposures for any original can be related to the latter. Thus, every original is assigned an identification number, and preferably a number representing its position in the strip of films. The identification number for an original is recorded on the magnetic tape together with the calculated exposures for the original.

The exposure control unit 25 is further shown to be connected with an imprinting device 30 which is arranged to imprint the identification number of, and the calculated exposures for, an original on the back of the copy made from the original. The imprinting device 30 again constitutes a recording means which permits the calculated exposures for an original to be recorded in such a manner that the recorded exposures can be related to the original. The imprinting device 30, which preferably comprises a printing needle or pen as illustrated, may be arranged to imprint the identification numbers and exposures on the backs of the copies in encoded or unencoded form. A bar code represents one type of code which may be used if the imprinting device 30 is designed to imprint the identification numbers and exposures in encoded form. The copying station includes an exposure window for the copy material and the imprinting device 30 is disposed at the downstream edge of this window. This enables the imprinting device 30 to imprint data on the back of a copy as the copy is transported out of the exposure window. The exposure window for the copy material is not visible in FIG. 1.

The imprinting device 30 may be present in lieu of or in addition to the disc drive 9. A transducer 35 is located between the exposure control unit 25 and the imprinting device 30.

In the left-hand portion of the copier 1 is a screen 40 for displaying commands given to the copier 1. Below the screen 40 is a densitometer 10 having a slot for insertion of copies of a calibrating or standard original. Measurement of the densities of the copies obtained from a calibrating original makes it possible to check the calibration of the copier 1 and to automatically recalibrate the latter if necessary. An automatic calibration procedure is described in detail in U.S. Pat. No. 4,464,045, and the disclosure of this patent is incorporated herein by reference.

Figure 2:
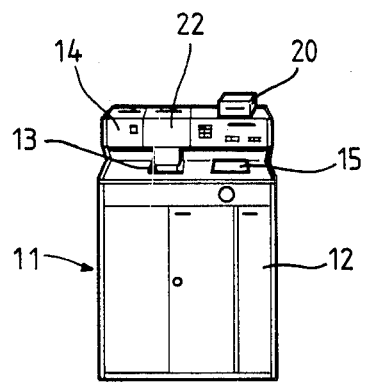
FIG. 2 is a front view of a relatively simple copier forming part of the copying arrangement.

FIG. 2 illustrates an auxiliary copier 11 forming part of the arrangement according to the invention. The auxiliary copier 11 serves to recopy originals which did not yield satisfactory copies in the primary copier 1. The auxiliary copier 11 recopies such originals with corrected exposures based on the exposures calculated by the exposure control unit 25 and recorded by the disc drive 9 or the imprinting device 30.

The auxiliary copier 11 is far simpler than the primary copier 1. It has neither automatic transporting means for the originals to be recopied nor a complicated scanning system for evaluating the originals.

The auxiliary copier 11 has a closed bottom portion 12 which houses transporting means for advancing copy material by a copying station having a copying window 13 for the originals. The copy material employed in the auxiliary copier 11 has the same dimensions as that accommodated by the supply unit 2 and take-up unit 3 of the primary copier 1. The copying window 13 is located below a lamp housing 22 having a closed cover, and an original to be recopied is placed on the copying window by an operator.

If the primary copier 1 is provided with the disc drive 9, the auxiliary copier 11 is likewise provided with a disc drive. This allows a magnetic disc which has been supplied with data in the primary copier 1 to be played back in the auxiliary copier 11 so that the data stored on the magnetic disc may be retrieved. The disc drive of the auxiliary copier 11 is identified by the reference numeral 20 and is located in the upper right-hand portion of the auxiliary copier 11.

Figure 3:
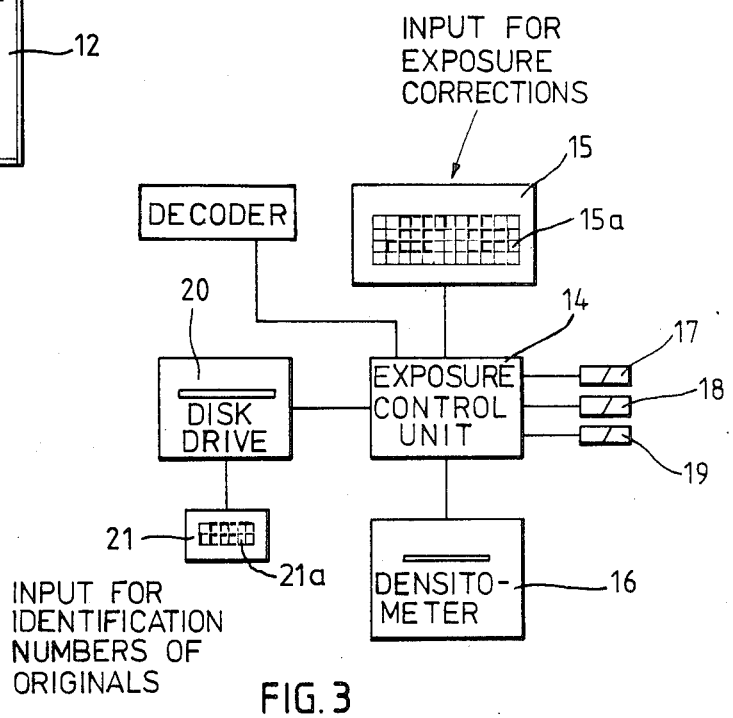
FIG. 3 is a block diagram of certain components of the copier of FIG. 2.

Below the disc drive 20 is a keyboard 15 which, as schematically shown in FIG. 3, has keys 15a. The purpose of the keyboard 15 is to enter correction factors for the exposures calculated by the exposure control unit 25 of the primary copier 1 and recorded on a magnetic disc or on the backs of the copies produced in the primary copier 1.

The auxiliary copier 11 also has an automatic exposure control unit or control means 14. The exposure control unit 14 functions to calculate the corrected exposures for an original, that is, to calculate the amount of light in each primary color to which an original is to be exposed during recopying. The exposure control unit 14 further functions to regulate the exposures for an original being recopied so that the correct amount of light in each primary color is passed through the original when it is recopied.

An original placed on the copying window 13 is illuminated by a source of white light disposed in the lamp housing 22. A condenser as well as a mixing shaft for the copy light are located between the light source and the copying window 13. Three subtractive filters, namely, cyan, magenta and yellow filters, are movable into the path of the rays issuing from the light source in a conventional manner. Each of these filters terminates the exposure in one of the primary colors upon being moved into such path. As illustrated in FIG. 3, the filters are driven by respective magnets 17, 18 and 19 which are controlled by the exposure control unit 14. The amount of copy light in each primary color is determined by the elapsed time from the beginning of an exposure to the shifting of a complementary color filter into the light path by the corresponding magnet 17, 18 or 19. The intensity of the copy light in each primary color may be regulated by so-called prefilters which possess maximum absorptivities in the respective colors and extend partly into the light path.

FIG. 3 shows that, in addition to the magnets 17-19, the exposure control unit 14 is connected with the magnetic head of the disc drive 20. As mentioned previously, the disc drive 20 is designed to receive and play back a magnetic disc which, in the disc drive 9 of the primary copier 1, recorded the exposure data calculated by the exposure control unit 25 of the primary copier 1. By connecting the disc drive 20 of the auxiliary copier 11 with the exposure control unit 14 of the copier 11, the recorded exposure data can be transmitted to the exposure control unit 14.

Each of the originals in the strip of films conveyed through the primary copier 1 is assigned an identification number representing the position of the original in the strip. The identification number for an original is recorded on the magnetic disc together with the exposures calculated by the exposure control unit 25 of the primary copier 1. As illustrated in FIG. 3, a small keyboard 21 having keys 21a is connected with the disc drive 20 of the auxiliary copier 11. The keyboard 21 serves as an input for the identification number of an original to be recopied so that the disc drive 20 correctly retrieves the recorded exposures for the original from the magnetic disc.

The keyboard 15 is also connected with the exposure control unit 14. The keyboard 15 serves as an input for exposure correction factors in each of the three primary colors. Thus, for each original to be recopied, the keyboard 15 is used to enter a correction factor for the recorded exposure in each primary color. The keyboard 15 further serves as an input for density correction factors. For example, the keyboard 15 may be divided into a plurality of correction areas each of which, in turn, has a series of keys 15a representing integers between −3 and +3 for the density and each primary color.

A densitometer 16 is connected with the exposure control unit 14 and is designed to measure the densities of copies derived from a calibrating original. The densitometer 16 makes it possible to check the calibration of the auxiliary copier 11. In this respect, the densitometer 16 corresponds to the densitometer 10 of the primary copier 1.

The operation of the arrangement including the copiers 1 and 11 is as follows:

Initially a supply reel 4 carrying a rolled up strip consisting of a series of individual films spliced end-to-end is placed in the primary copier 1. The leading end of the strip is connected with the driven take-up reel 8 which then advances the strip along the copier 1 so that the originals or negatives, which constitute discrete frames of the strip and the films, pass through the copier 1 seriatim. As an original enters the scanning station 6, the density of the original in each of the primary colors is measured. In accordance with the teachings of U.S. Pat. No. 4,279,502, which teachings are incorporated herein by reference, the amount of copy light for an original in each primary color is calculated from a first parameter characteristic of the film containing the original and a second parameter characteristic of the particular original. The parameter characteristic of the film, which is based on density measurements obtained from several or all originals of the film, is established before the leading original of the film arrives at the copying station so that this parameter may be employed in calculating the exposures for the leading original. In order to delay arrival of the leading original of a film at the copying station, each film is temporarily stored in the accumulator 5 after leaving the scanning station 6. The accumulator 5 functions to increase the length of the path between the scanning station 6 and the copying station to such an extent that the leading original of a film does not enter the copying station until sufficient data to calculate the exposures of the leading original has been gathered. The accumulator 5 causes the films to follow a tortuous path which is generally long enough to accommodate an entire film. As each film travels through the scanning station 6, all of the densities necessary to calculate the exposures of the respective originals in the primary colors are measured and stored in the exposure control unit 25. The exposure control unit 25 calculates the exposures for each original before the original arrives at the copying station.

Upon exiting the accumulator 5, each original enters the copying station where it is copied onto the band of copy material carried by the supply unit 2 and take-up unit 3. The exposure control unit 25 regulates the exposures of each original during copying so that the amount of copy light in each primary color corresponds to that calculated by the exposure control unit 25 for the respective original. After the copying operation, the original which has just been copied is shifted towards the take-up reel 8 and a fresh original is advanced into the copying station. At the same time, the band of copy material is advanced towards the take-up unit 3 through a distance roughly equal to the length of the latent image which has just been formed on the portion of the copy material located at the copying station. This causes the portion of the copy material which has just been exposed to move out of the copying station while a neighboring, unexposed portion of the copy material enters the copying station. Successive originals are thus copied onto neighboring portions of the band of copy material.

When an original is copied, the exposures for the original in each of the primary colors as calculated by the exposure control unit 25 are recorded, preferably on a logarithmic scale. The exposures may be magnetically recorded in an encoded form by a magnetic disc in the disc drive 9 or may be imprinted on the back of the corresponding copy by the imprinting device 30 inside the primary copier 1. As indicated previously, each original has an identification number representing its position in the strip of films, and this identification number is recorded together with the exposures for the respective original. Regardless of how the exposures are recorded, the identification number for an original is always indicated on the back of the corresponding copy.

The primary copier 1 exposes the individual originals one after the other at high speed. Once the end of the strip of films has been reached, all of the originals have been transferred to the take-up reel 8 while the undeveloped copies have been wound onto the take-up unit 3. The take-up unit 3 is now transported to a roll developing apparatus in a conventional manner. The exposed band of copy material is developed and dried, and the copies are visually inspected to determine image quality. Those copies having an unsatisfactory image quality which can be expected to improve upon recopying are marked so as to be detectable by a machine. For instance, a wax pencil may be used to mark each unsatisfactory original with a transverse line.

The marked roll of copies and the corresponding roll of originals are now brought to a cutting and packaging apparatus. Here, the strip of films is cut into sections containing four or five originals each. The various sections are grouped by customer order. The band of copy material, on the other hand, is cut into single copies which are likewise grouped by customer order. Any order which does not contain copies marked as being unsatisfactory can then be invoiced and delivered to the customer. Orders which do include one or more unsatisfactory copies are sorted out and taken to the auxiliary copier 11.

If the exposures calculated by the exposure control unit 25 of the primary copier 1 were recorded on a magnetic disc, such disc is inserted in the disc drive 20 of the auxiliary copier 11. An operator removes an unsatisfactory copy from one of the orders containing a copy of this type. As indicated above, the back of each copy is imprinted with the identification number of the corresponding original. This identification number represents the position of the original in the strip of films conveyed through the primary copier 1 and is made up of the number of the film which contained the original and the number of the original in the film. The identification number may be imprinted on the copy in unencoded form and, in such an event, the operator reads the identification number from the unsatisfactory copy and enters this number in the auxiliary copier 11 via the keyboard 21. The disc drive 20 then retrieves the recorded exposures for the respective original from the magnetic disc and transmits these exposures to the exposure control unit 14. The operator further evaluates the unsatisfactory copy and, based on this evaluation, enters appropriate correction factors into the keyboard 15. The exposure control unit 14 calculates corrected amounts of copy light for the original corresponding to the unsatisfactory copy by applying the correction factors to the amounts of copy light retrieved from the magnetic disc. The corrected amount of copy light in each primary color is converted into an exposure time so that the exposure control unit 14 can regulate the amount of copy light in a primary color by timed activation of the appropriate magnet 17, 18 or 19. Activation of a magnet 17, 18 or 19 causes the associated subtractive filter to be moved into the path of the copy light thereby terminating the exposure in the respective primary color.

The magnetic disc used to record the exposures for a given strip of films can be erased and employed for a new strip once the copying operations for the original strip have been completed.

For optimum results, the auxiliary copier 11 should be adjusted so that the intensity I of the copy light in each primary color yields the correct amount of copy light I $\times$ t when multiplied by the corresponding exposure time t calculated via the exposure control unit 14. In order to assure that this is the case, the auxiliary copier 11 is calibrated. This is accomplished by first making a copy of a calibrating or standard original in the primary copier 1. The calibrating original is now placed in the auxiliary copier 11 and all corrections on the keyboard 15 are set to zero. A copy of the calibrating original is then made in the auxiliary copier 11. If the auxiliary copier 11 is properly adjusted, the densities of the calibrating copy produced by the auxiliary copier 11 should be identical to those of the calibrating copy made in the primary copier 1. In order to ascertain whether or not this is so, the densitometer 16 of the auxiliary copier 11 is calibrated by inserting the calibrating copy obtained from the primary copier 1 therein. The densities of this calibrating copy serve as reference values. After removal of the calibrating copy produced by the primary copier 1, the calibrating copy made in the auxiliary copier 11 is inserted in the densitometer 16. If the densities of the calibrating copy obtained from the auxiliary copier 11 differ from those of the calibrating copy made in the primary copier 1, the auxiliary copier 11 is adjusted. Preferably, the auxiliary copier 11 is adjusted in such a manner that a copy of the calibrating original produced by the auxiliary copier 11 without corrections has the same densities as a copy of the calibrating original obtained from the primary copier 1. Adjustment of the auxiliary copier 11 may be performed in conventional manner by depressing appropriate correction keys and storing the corrections in the exposure control unit 14. Alternatively, the auxiliary copier 11 may be adjusted by automatic compensation of the exposure control unit 14 as taught in U.S. Pat. No. 4,464,045.

As mentioned earlier, the exposures calculated by the exposure control unit 25 of the primary copier 1 may be imprinted on the backs of the copies made in the copier 1 instead of being magnetically recorded via the disc drive 9. The exposures for an original may be imprinted on the back of the corresponding copy in a machine-readable, encoded form, e.g., in the form of a bar code, preferably on a logarithmic scale. In such an event, the auxiliary copier 11 is provided with a conventional, automatic decoder in lieu of or in addition to the disc drive 20. The decoder is connected with the exposure control unit 14. The operator inserts an unsatisfactory copy in the decoder which automatically reads the encoded exposures on the back of the copy and transmits these exposures to the exposure control unit 14. The exposure control unit 14 can then calculate corrected exposures once the appropriate correction factors have been entered in the keyboard 15. It is unnecessary to enter the identification number of the original corresponding to the unsatisfactory copy being read by the decoder because the exposures for the different originals are not stored in a common memory such as a magnetic disc, i.e., the only exposures available to the decoder are those on the unsatisfactory copy currently being read. Thus, it is possible to omit the keyboard 21. The identification number of the original corresponding to the unsatisfactory copy may be imprinted on the back of the copy in unencoded form so that the operator is able to retrieve the original.

Instead of imprinting the exposures calculated by the exposure control unit 25 of the primary copier 1 on the copies in encoded form, such exposures may be imprinted on the backs of the copies in unencoded form. The operator then reads the exposures imprinted on an unsatisfactory copy and manually enters the exposures in the exposure control unit 14 of the auxiliary copier 11. The identification number of the original corresponding to the unsatisfactory copy may again be imprinted on the copy in unencoded form so that the operator can retrieve the original.

It is possible for the operator to mark the back of each unsatisfactory copy with the required correction factors at the time that the operator evaluates the copies to determine which are unsatisfactory, i.e., after the band of exposed copy material has been developed but before it is cut into individual copies. The correction factors may be marked on the unsatisfactory copies in encoded form and, in such an event, the keyboard 15 may include or be replaced by a decoder capable of reading the correction factors.

The exposure control unit 14 may be a conventional microprocessor, e.g., the Falcon microprocessor of Digital Equipment Corp.

Without further analysis, the foregoing will so fully reveal the gist of the present invention that others can, by applying current knowledge, readily adapt it for various applications which, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for copying colored originals comprising:
   (a) a first copier having scanning means for measuring the densities of the originals in the primary colors, and first copying means including first control means connected with said scanning means and designed to calculate the exposures for each original in each primary color based on the measured densities, said first control means also being designed to control the illumination of each original in each primary color and said first copier further comprising recording means connected with said first control means and arranged to record the calculated exposures for each original in such a manner as to permit the recorded exposures for an original to be related thereto, said recording means including a first drive for a floppy disc; and
   (b) a second copier having second copying means for recopying an original with corrected exposures when a copy of the original made in said first copier is unsatisfactory, said second copier further including correcting means for correcting the recorded exposures for an original, and a second drive for a floppy disc to thereby permit retrieval of the recorded exposures, said second copier being devoid of means for measuring the densities of the originals.

2. The arrangement of claim 1 wherein each original has a number and said first copier includes imprinting means arranged to imprint the number of an original on the corresponding copy.

3. An arrangement for copying colored originals comprising:
   (a) a first copier having scanning means for measuring the densities of the originals in the primary colors, and first copying means including first control means connected with said scanning means and designed to calculate the exposures for each original in each primary color based on the measured densities, said first control means also being designed to control the illumination of each original in each primary color, and said first copier further comprising recording means connected with said first control means and arranged to record the calculated exposures for each original in such a manner as to permit the recorded exposures for an original to be related thereto; and
   (b) a second copier having second copying means for recopying an original with corrected exposures when a copy of the original made in said first copier is unsatisfactory, said second copier further including correcting means for correcting the recorded exposures for an original, and said second copier also including calibrating means designed to permit calibration of said second copier in such a manner that a copy of a calibrating original made in said second copier without corrections has substantially the same densities as a copy of the calibrating original made in said first copier, said copier being devoid of means for measuring the densities of the originals.

4. The arrangement of claim 3, wherein said recording means comprises imprinting means for imprinting each of the copies made in said first copier with the calculated exposures for the corresponding original.

5. The arrangement of claim 4, each original constituting a discrete frame of a coherent strip, and said first copier including first transporting means for advancing the strip along a first path, and second transporting means for advancing a band of copy material along a second path; and wherein said first copying means comprises a copying station at which copy material in said second path is exposed to illumination transmitted through an original in said first path, said copying station including an exposure window having a downstream edge, and said imprinting means being located in the region of said edge.

6. The arrangement of claim 4, wherein said imprinting means comprises a printing needle.

7. The arrangement of claim 4, comprising a transducer between said first control means and said imprinting means.

8. The arrangement of claim 4, wherein said imprinting means is designed to imprint the calculated exposures in unencoded form.

9. The arrangement of claim 4, wherein said imprinting means is designed to imprint the calculated exposures in the form of a bar code.

10. The arrangement of claim 4, said imprinting means being designed to imprint the calculated exposures in encoded form, and said second copying means including second control means for controlling the illumination of an original in each primary color; and wherein said second copier further comprises a decoder for the encoded exposures, said correcting means including input means for exposure correction factors, and said decoder and said input means being connected with said second control means.

11. The arrangement of claim 4, wherein said imprinting means is arranged to imprint the calculated exposures on the backs of the copies made in said first copier.

12. The arrangement of claim 4, wherein said correcting means comprises input means for exposure correction factors, said input means including a decoder for encoded exposure correction factors marked on the copies from said first copier.

13. The arrangement of claim 3, wherein said recording means is designed to record the calculated exposures magnetically.

14. The arrangement of claim 13, wherein said recording means comprises a drive for a magnetic disc.

15. The arrangement of claim 13, each original constituting a discrete frame of a coherent strip, and said first copier including transporting means for advancing the strip; and wherein said recording means is designed to record the calculated exposures for an original at a location of a magnetic memory which is related to the position of the original in the strip.

16. The arrangement of claim 15, wherein said second copier comprises retrieving means for retrieving the magnetically recorded exposures, and an input for the positions of the originals connected with said retrieving means.

* * * * *